United States Patent Office.

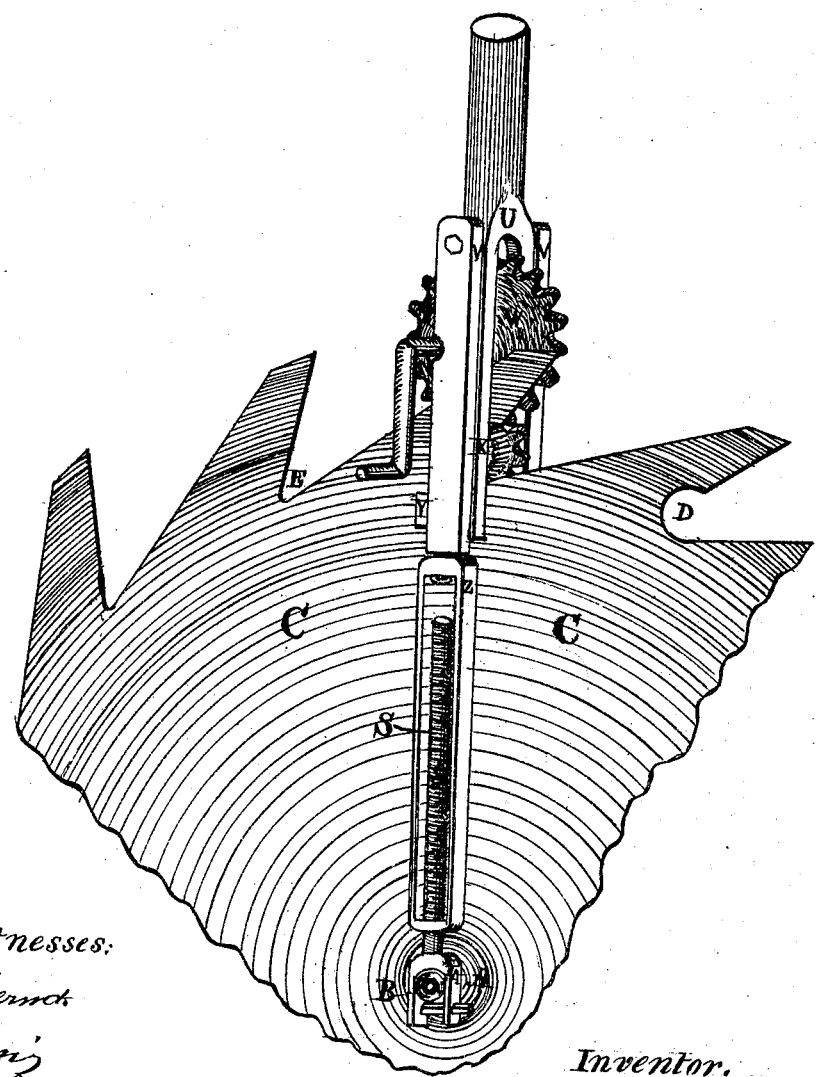

ANSON B. DOUGLAS, OF CLYDE, OHIO.

Letters Patent No. 103,726, dated May 31, 1870.

IMPROVEMENT IN SAW-GUMMERS.

The Schedule referred to in these Letters Patent and making part of the same

I, ANSON B. DOUGLAS, of Clyde, in the county of Sandusky and State of Ohio, have invented certain Improvements in Saw-Gummers, of which the following is a specification.

My invention consists in the combination and arrangement of the parts relating to each other, as hereinafter described.

In the accompanying drawing—
U is the frame.
V V are two levers, which are pivoted to the frame.
W is the crank-wheel, driving die.
X is a die, provided with draw-cut teeth.
Y is a shoulder, on which lever V rests.
Z is a swivel, attached to lever.
A is a clamp, which is fastened on the saw-arbor; said clamp is also provided with a screw, which connects with the swivel.
B is the saw-arbor, on which the clamp is fastened.
C C is a section of a saw in position for gumming.
D is a tooth, gummed.
E is a tooth before gumming.

Claim.

I claim the construction and arrangement of the frame U, and its operative mechanism, the swinging arms or levers V, the swivels Z, with screws S and clamps A, substantially as described.

ANSON B. DOUGLAS.

Witnesses:
A. L. HATFIELD,
N. B. MASON.